US009185635B2

(12) United States Patent
Hakola et al.

(10) Patent No.: US 9,185,635 B2
(45) Date of Patent: Nov. 10, 2015

(54) METHOD AND APPARATUS FOR SUPPORTING PROXIMITY-BASED SERVICES

(71) Applicant: Broadcom Corporation, Irvine, CA (US)

(72) Inventors: Sami-Jukka Hakola, Kempele (FI); Samuli Turtinen, Ii (FI); Timo Kalevi Koskela, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 163 days.

(21) Appl. No.: 14/038,142

(22) Filed: Sep. 26, 2013

(65) Prior Publication Data

US 2015/0087297 A1    Mar. 26, 2015

(51) Int. Cl.
| | |
|---|---|
| *H04W 36/00* | (2009.01) |
| *H04W 24/00* | (2009.01) |
| *H04W 4/00* | (2009.01) |
| *G08C 17/00* | (2006.01) |
| *H04W 48/14* | (2009.01) |
| *H04W 88/06* | (2009.01) |
| *H04W 48/10* | (2009.01) |
| *H04W 48/12* | (2009.01) |
| *H04W 76/02* | (2009.01) |

(52) U.S. Cl.
CPC .............. *H04W 48/14* (2013.01); *H04W 4/008* (2013.01); *H04W 36/0072* (2013.01); *H04W 48/10* (2013.01); *H04W 48/12* (2013.01); *H04W 76/023* (2013.01); *H04W 88/06* (2013.01)

(58) Field of Classification Search
CPC ..... H04W 8/005; H04W 84/18; H04W 36/30; H04W 36/18
USPC ........... 455/436, 450, 454, 456.3, 425, 426.1; 370/311
See application file for complete search history.

(56) References Cited

U.S. PATENT DOCUMENTS

| | | | |
|---|---|---|---|
| 2009/0016315 A1* | 1/2009 | Laroia et al. ................... | 370/345 |
| 2009/0185539 A1* | 7/2009 | Ohta et al. ...................... | 370/331 |
| 2013/0288668 A1* | 10/2013 | Pragada et al. ............. | 455/426.1 |
| 2014/0004796 A1* | 1/2014 | Cakulev et al. .............. | 455/41.2 |
| 2014/0064147 A1* | 3/2014 | Wang et al. .................... | 370/255 |
| 2014/0206322 A1* | 7/2014 | Dimou et al. ............... | 455/414.1 |
| 2014/0274066 A1* | 9/2014 | Fodor et al. ................... | 455/437 |
| 2014/0315562 A1* | 10/2014 | Lim et al. ....................... | 455/450 |
| 2014/0321452 A1* | 10/2014 | Choi et al. ..................... | 370/350 |
| 2014/0342747 A1* | 11/2014 | Lee et al. ....................... | 455/450 |
| 2015/0071189 A1* | 3/2015 | Park et al. ...................... | 370/329 |

* cited by examiner

*Primary Examiner* — Dung Hong
(74) *Attorney, Agent, or Firm* — Oblon, McClelland, Maier & Neustadt, L.L.P.

(57) ABSTRACT

A method, apparatus and computer program product are provided to facilitate ProSe operation. In the context of a method, a mobile terminal is camped on to a second cell that does not proximity-based services (ProSe), while in a state in which context information not stored by a network. The method also determines whether signals are received from a first cell that does support ProSe and that satisfy a predefined condition, such as a predefined strength of the signals from the first cell, a predefined reliability metric, an allowed transmit power or a time for which one or more parameters will remain effective. In an instance in which the predefined condition is satisfied, the method also includes receiving discovery messages from a mobile terminal camped in the first cell, while being camped in the second cell.

17 Claims, 6 Drawing Sheets

METHOD AND APPARATUS FOR SUPPORTING PROXIMITY-BASED SERVICES

TECHNOLOGICAL FIELD

An example embodiment relates generally to the provision of proximity-based services (ProSe) and, more particularly, to the support of ProSe operations while camped on to a cell that does not support ProSe.

BACKGROUND

ProSe permits mobile terminals to transmit radio signals directly to and receive radio signals directly from other mobile terminals in proximity thereto. Thus, ProSe includes, for example, device-to-device (D2D) communications. The transmission of radio signals directly between mobile terminals during ProSe operation may be performed under network control, such as in instances in which the radio signals are within the licensed spectrum of a network operator. Alternatively, in instances in which public safety messages are transmitted utilizing a dedicated public safety spectrum, the transmission of radio signals directly between mobile terminals in accordance with ProSe operation may be performed autonomously without network control.

ProSe may operate in any one of a plurality of states, such as an RRC_Idle state, an RRC_Connected state or a hybrid RRC state or sub-state (both of which are referenced as a hybrid RRC herein) that is designed for ProSe purposes and that may include characteristics of both the RRC_Idle state and the RRC_Connected state. For example, in both the RRC_Idle state and the hybrid RRC state, the network, such as an Evolved Universal Mobile Telecommunications System (UMTS) Terrestrial Radio Access Network (E-UTRAN), may not create and store context for the mobile terminal, while in the RRC_Connected state the network may create and store context for the mobile terminal. Additionally, the mobile terminal may be synchronized with the network in both the RRC_Connected state and the hybrid RRC state even though the mobile terminal is not synchronized with the network in the RRC_Idle state.

In order to perform ProSe under network control, the network operator and, as such, the cell upon which the mobile terminal is camped must support ProSe operation since, among other reasons, ProSe discovery resources may be allocated on a per cell basis by the network, such as the E-UTRAN. The network may provide the radio resources to the ProSe-capable mobile terminals, such as by session information block (SIB) signaling. Thus, while in the RRC_Idle state or in the hybrid RRC state in which no context information for the mobile terminal is stored by the network, a mobile terminal that is camped in a cell that supports ProSe by providing the necessary radio resources may be able to transmit and receive ProSe discovery messages so as to commence ProSe operation, such as D2D communication, with another mobile terminal.

In an instance in which a mobile terminal that is utilizing ProSe is operating in a state in which the network does not maintain context information for the mobile terminal, such as the RRC_Idle state or the hybrid RRC state, the mobile terminal may perform cell re-selection to a cell that does not provide or support ProSe services. As such, the mobile terminal may be unable to continue ProSe operation following cell re-selection. In this regard, the mobile terminal may be unable to both transmit and receive discovery messages or participate in D2D communication in the cell that does not support ProSe services. Thus, the mobile terminal may be unable to rely upon continued ProSe operation in an instance in which the mobile terminal re-selects to another cell.

BRIEF SUMMARY

A method, apparatus and computer program product are provided in accordance with an example embodiment in order to provide ProSe operation in at least certain circumstances for a mobile terminal that is camped on to a cell that does not support ProSe. In this regard, the method, apparatus and computer program product of an example embodiment may provide for the continued receipt of discovery messages following re-selection to a cell that does not support ProSe while a mobile terminal is operating the state in which the network does not store context information, at least in certain circumstances. As such, mobile terminals, including mobile terminals operating in the state in which the network does not store context information, may take at least partial advantage of ProSe operation, such as D2D communication, even while camped on to a cell that does not support ProSe.

In an example embodiment, a method is provided that includes camping on to a second cell that does not support proximity-based services (ProSe), while in a state in which context information not stored by a network. While camped on to the second cell, the method also determines whether signals are still received from the first cell that satisfy a predefined condition, such as at least one of a predefined strength of the signals from the first cell, a predefined reliability metric, an allowed transmit power or a time for which one or more parameters will remain effective. In an instance in which the predefined condition is satisfied, the method also includes receiving a discovery message from a mobile terminal camped in the first cell, while being camped in the second cell.

The method of an example embodiment may also include receiving one or more parameters for ProSe operation including one or more parameters related to monitoring for the discovery message while camped in the second cell. In this regard, the method may include receiving the one or more parameters upon release of a radio resource connection (RRC) with the first cell. The method of an example embodiment may also include receiving, while camped in the second cell, information from the first cell regarding an assignment of resources for transmission of discovery messages by the mobile terminal camped in the first cell. The method of an example embodiment may also include performing cell-reselection from the first cell to the second cell prior to camping on to the second cell and ceasing transmission of discovery messages upon re-selection to the second cell such that the receipt and transmission of discovery messages are no longer symmetric.

In another example embodiment, an apparatus is provided that includes at least one processor and at least one memory including computer program code with the at least one memory and the computer program code configured to, with the at least one processor, cause the apparatus at least to camp on to a second cell that does not support proximity-based services (ProSe), while in a state in which context information is not stored by a network. The at least one memory and the computer program code are also configured to, with the at least one processor, cause the apparatus of this example embodiment to determine whether signals are still received from a first cell that does support ProSe and that satisfy a predefined condition, such as at least one of a predefined strength of the signals from the first cell, a predefined reliability metric, an allowed transmit power or a time for which one or more parameters will remain effective. The at least one memory and the computer program code are also configured to receive, in an instance in which the predefined condition is satisfied, a discovery message from a mobile terminal camped in the first cell while being camped in the second cell.

The least one memory and the computer program code may be further configured to, with the at least one processor, cause the apparatus of an example embodiment to receive one or more parameters for ProSe operation including one or more parameters related to monitoring for the discovery message while camped in the second cell. In this regard, the one or more parameters may be received upon release of a radio resource connection (RRC) with the first cell. The least one memory and the computer program code may be further configured to, with the least one processor, cause the apparatus of an example embodiment to receive, while camped in the second cell, information from the first cell regarding an assignment of resources for transmission of discovery messages by the mobile terminal camped in the first cell. The at least one memory and the computer program code may be further configured to, with the at least one processor, cause the apparatus of an example embodiment to perform cell-reselection from the first cell to the second cell prior to camping on to the second cell and to cease transmission of discovery messages upon re-selection to the second cell. The apparatus of an example embodiment may include or be embodied by a mobile terminal.

In a further example embodiment, a computer program product is provided that includes at least one non-transitory computer-readable storage medium having computer-readable program instructions stored therein with the computer-readable program instructions including program instructions configured to camp on to a second cell that does not support proximity-based services (ProSe), while in a state in which context information is not stored by a network. The computer-readable program instructions also include program instructions configured to determine, while camped on to the second cell, whether signals are still received from a first cell that does support ProSe that satisfy a predefined condition and, in an instance in which the predefined condition is satisfied, program instructions configured to receive a discovery message from a mobile terminal camped in the first cell, while being camped in the second cell.

In yet another example embodiment, an apparatus is provided that includes means for camping on to a second cell that does not support proximity-based services (ProSe), while in a state in which context information is not stored by a network. The apparatus also includes means for determining, while camped on to the second cell, whether signals are still received from a first cell that does support ProSe that satisfy a predefined condition. In an instance in which the predefined condition is satisfied, the apparatus also includes means for receiving a discovery message from a mobile terminal camped in the first cell, while being camped in the second cell.

In an example embodiment, a method is provided that includes providing support for proximity-based services (ProSe) operation for a mobile terminal that is camped in the first cell and that is in the state in which context information is not stored by a network. The method also includes determining that the mobile terminal has re-selected from the first cell to a second cell and then causing a radio resource connection with the mobile terminal to be released. The method also includes causing one or more parameters for ProSe operation to be provided to the mobile terminal. The one or more parameters for ProSe operation may include one or more parameters relating to monitoring for a discovery message while the mobile terminal is camped in the second cell. For example, the one or more parameters may define at least one of a predefined signal strength, a predefined reliability metric, an allowed transmit power level or a time for which one or more parameters will remain effective.

The method of an example embodiment may cause the one or more parameters for ProSe operation to be provided by causing dedicated signaling of the one or more parameters for ProSe operation to be provided to the mobile terminal upon release of the radio resource connection with the mobile terminal. Alternatively, the method of an example embodiment may cause the one or more parameters for ProSe operation to be provided by causing a broadcast of the one or more parameters for ProSe operation to be provided upon release of the radio resource connection with the mobile terminal.

In another example embodiment, an apparatus may be provided that includes at least one processor and at least one memory including computer program code with at least one memory and the computer program code configured to, with the at least one processor, cause the apparatus at least to provide support for proximity-based services (ProSe) operation for a mobile terminal that is camped in the first cell and that is in a state in which context information is not stored by a network. The at least one memory and the computer program code are also configured to, with the at least one processor, cause the apparatus to determine that the mobile terminal has re-selected from the first cell to a second cell and to cause a radio resource connection with the mobile terminal to be released. The at least one memory and the computer program code are also configured to, with the at least one processor, cause the apparatus to cause one or more parameters for ProSe operation to be provided to the mobile terminal. The one or more parameters for ProSe operation may include one or more parameters relating to monitoring for a discovery message while the mobile terminal is camped in the second cell. The one or more parameters may define at least one of a predefined signal strength, a predefined reliability metric, an allowed transmit power level or a time for which one or more parameters will remain effective.

The at least one memory and the computer program code may be configured to, with the at least one processor, cause the apparatus of an example embodiment to cause the one or more parameters for ProSe operation to be provided by causing dedicated signaling of the one or more parameters for ProSe operation to be provided to the mobile terminal upon release of the radio resource connection with the mobile terminal. Alternatively, the at least one memory and the computer program code may be configured to, with the at least one processor, cause the apparatus of an example embodiment to cause the one or more parameters for ProSe operation to be provided by causing a broadcast of the one or more parameters for ProSe operation to be provided upon release of the radio resource connection with the mobile terminal. The apparatus of an example embodiment may be included or embodied by an access point for a cellular network.

In a further example embodiment, a computer program product is provided that includes at least one non-transitory computer-readable storage medium having computer-readable program instructions stored therein with the computer-readable program instructions including program instructions configured to provide support for proximity-based services (ProSe) for a mobile terminal that is camped in a first cell and that is in a state in which context information is not stored by a network. The computer-readable program instructions may also include program instructions configured to determine that the mobile terminal has re-selected from the first cell to the second cell and program instructions configured to cause a radio resource connection with the mobile terminal to be released. The computer-readable program instructions may also include program instructions configured to cause one or more parameters for ProSe operation to be provided to the mobile terminal. The one or more parameters for ProSe operation include one or more parameters related to monitoring for a discovery message while the mobile terminal is camped in the second cell.

In yet another example embodiment, an apparatus is provided that includes means for providing support for proximity-based services (ProSe) for a mobile terminal that is camped in the first cell and that is in a state in which context information is not stored by the network. The apparatus also includes means for determining that the mobile terminal has re-selected from the first cell to a second cell and means for causing a radio resource connection with the mobile terminal to be released. The apparatus also includes means for causing one or more parameters for ProSe operation to be provided to the mobile terminal. The one or more parameters for ProSe operation include one or more parameters related to monitoring for a discovery message while the mobile terminal is camped in the second cell.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided in accordance with an example embodiment in order to permit the receipt of proximity-based services (ProSe) discovery messages under certain conditions while camped on to a second cell that does not support ProSe, such as following re-selection of a mobile terminal from a first cell that supports ProSe to the second cell. In this regard, the method, apparatus and computer program product of an example embodiment may provide for the continued receipt of ProSe discovery messages following the cell re-selection by a mobile terminal that is operating in a state in which context information for the mobile terminal is not stored by the network, such as an RRC_Idle state or the hybrid RRC state. By providing for continued receipt of ProSe discovery messages under certain conditions following cell re-selection, a method, apparatus and computer program product of an example embodiment may provide an improved user experience with continued utilization of ProSe even as the mobile terminal re-selects to a different cell that does not support ProSe.

Figure 1:
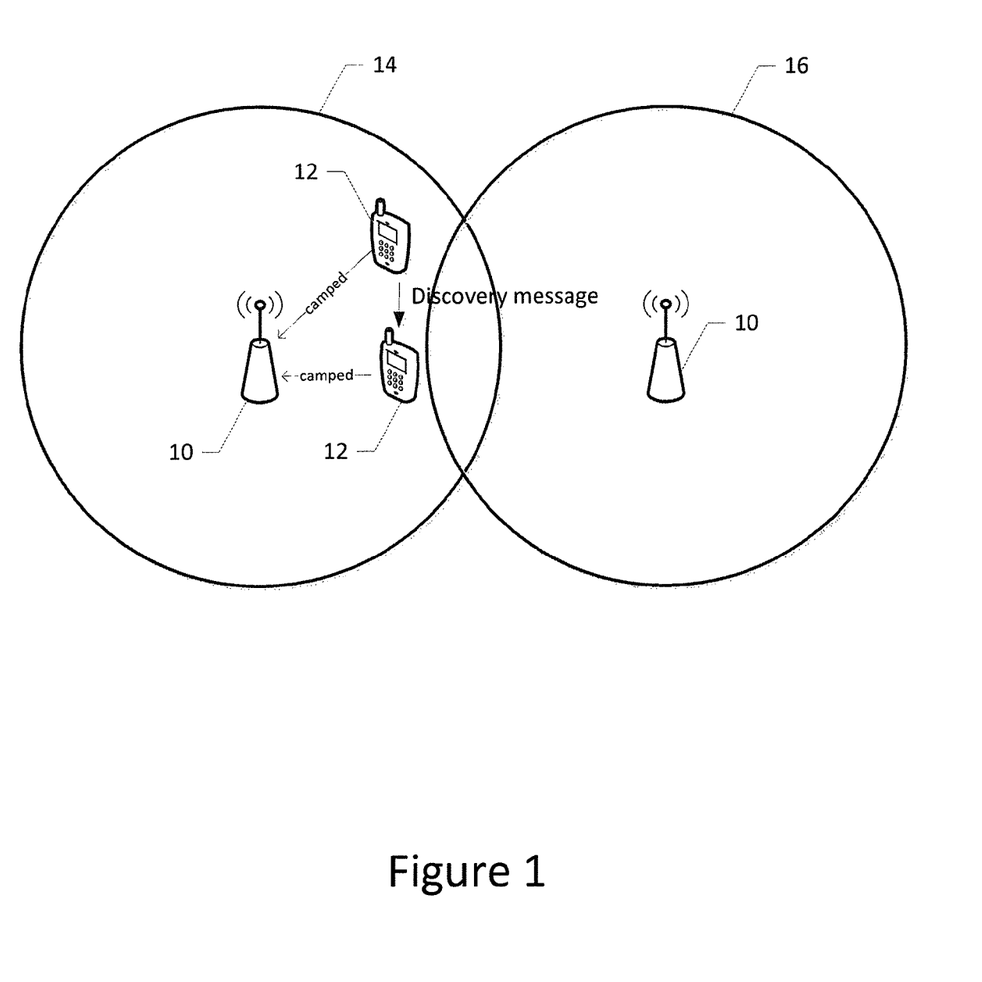
FIG. 1 is an example schematic representation of mobile terminals camped in a first cell in which ProSe services are supported.

By way of example, FIG. 1 depicts access points 10 that communicate with and serve one or more mobile terminals 12 while the mobile terminals are within the cell served by the respective access point and are camped onto the respective access point. An access point may be embodied by a variety of different devices, such as a base station, a node B, an evolved node B, a relay node or the like. The access points 10 may provide access to a network, such as a cellular network, for the mobile terminals 12 camped onto the access point. In this regard, the access points may provide access to a variety of different cellular networks including, for example, an 802.11 network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, an E-UTRAN or other type of network.

Some, but not all of the access points 10 may also support ProSe by allocating radio resources for discovery operations between the mobile terminals 12, such as from uplink resources of the serving network system. In at least some instances, the access point may support ProSe by allocating ProSe discovery resources to the mobile terminals, such as via session information block (SIB) signaling to the mobile terminal. With reference to FIG. 1, for example, the access point that serves the first cell 14 may support ProSe, while the access point that serves the second cell 16 may not support ProSe (such as by not allocating radio resources for discovery operations between the mobile terminals).

Additionally, the mobile terminals that are served by the access point may be embodied by a variety of user devices, also referenced as user equipment (UE), including, for example, mobile communication devices such as, for example, mobile telephones, personal digital assistants (PDAs), pagers, laptop computers, tablet computers or any of numerous other hand held or portable communication devices, computation devices, content generation devices, content consumption devices, or combinations thereof.

As illustrated in FIG. 1, at least some of the mobile terminals 12 may also be configured for ProSe operation in which the mobile terminals communicate directly with one another, such as in conjunction with device-to-device (D2D) communications and/or UE discovery. In this regard, the mobile terminals may transmit ProSe discovery messages to other mobile terminals proximate thereto so that a mobile terminal that receives the ProSe discovery message is able to discover the mobile terminal that transmitted the ProSe discovery message. The transmission of ProSe discovery messages is a connection-less and broadcast type of operation that serves to announce the mobile terminal that transmits the ProSe discovery message as well as application layer data to other mobile terminals in proximity thereto. Following discovery, the mobile terminal may communicate directly with one another, such as by engaging in D2D communication including, for example, broadcast and groupcast transmissions. As such, the resulting D2D communication is offloaded from the network.

During ProSe operation, the mobile terminal 12 may operate in any one of a variety of different states. For example, the mobile terminal may operate in an RRC_Connected state in which the mobile terminal is synchronized to the network and the network creates and maintains context information for the mobile terminal. Alternatively, the mobile terminal may operate in an RRC_Idle state in which the mobile terminal is not synchronized with the network and the network including the access point 10 does not create and store context for the mobile terminal. Still further, the mobile terminal may operate in a hybrid RRC state in which the mobile terminal is synchronized to the network as in the RRC_Connected state, but the network including the access point does not create and store context for the mobile terminal as in the RRC_Idle state.

Figure 2:
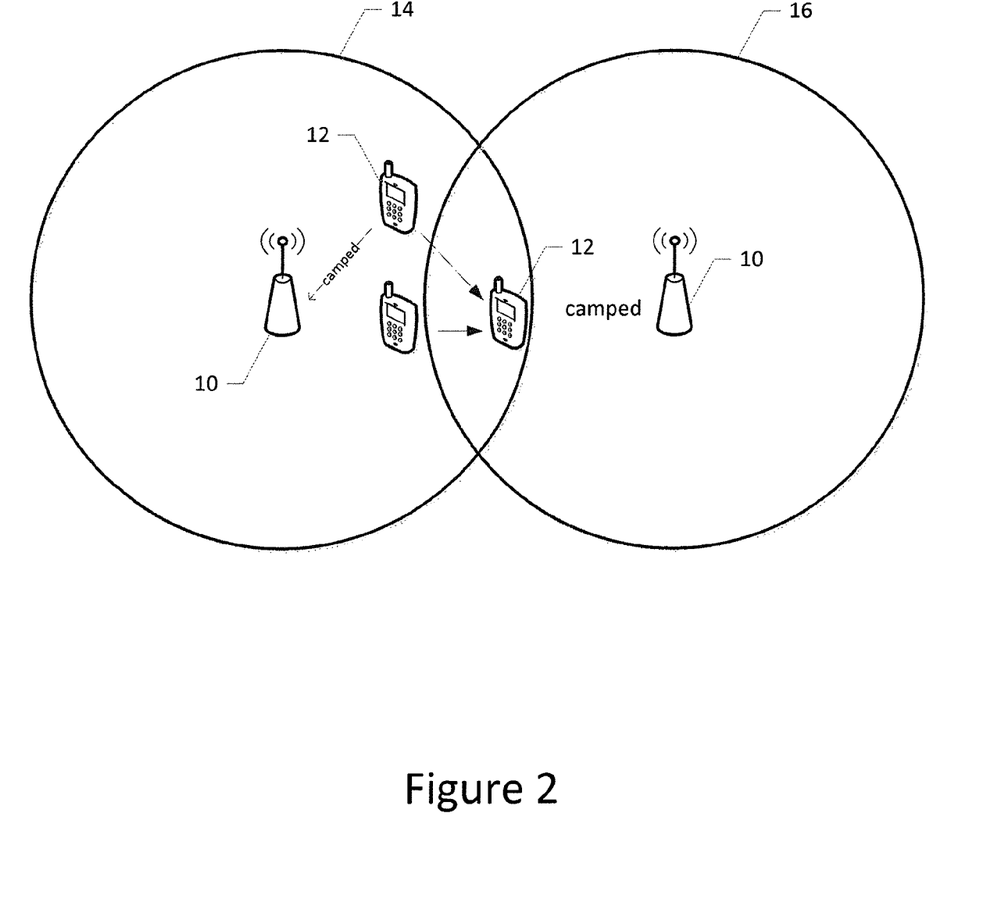
FIG. 2 is an example schematic representation of first and second neighboring cells following re-selection of a mobile terminal from the first cell to the second cell that does not support ProSe, but that may be configured in accordance with an example embodiment of the present invention in order to permit continued receipt of ProSe discovery messages.

In the example embodiment depicted in FIG. 1, one of the access points 10 may serve mobile terminals 12 that are camped onto the access point within a first cell 14. Similarly, another access point may serve mobile terminals camped onto the other access point within a second cell 16. In FIG. 1, both mobile terminals are within the first cell and camped onto the corresponding access point. However, in FIG. 2, one of the mobile terminals has moved closer to the neighboring access point. As shown in FIG. 2, the mobile terminal that has moved is within both the first and second cells, but has re-selected from the first cell to the second cell and is now camped onto the access point that serves the second cell. For example, the mobile terminal may have re-selected from the access point that serves the first cell to the access point that serves the second cell due to, for example, relative signal strength, reliability criteria or any other cell re-selection criteria. Thus, even though the mobile terminal that has moved remains within the first cell and may receive signals from the access point that serves the first cell as well as from the other mobile terminal that remains camped onto the access point that serves the first cell, the mobile terminal that has moved has now camped onto the access point that serves the second cell and will be supported thereby. As noted above, however, unlike the access point that serves the first cell that supports ProSe, the access point that serves the second cell does not support ProSe.

In accordance with an example embodiment, however, the method, apparatus and computer program product may permit a mobile terminal, such as the mobile terminal 12 that has moved, to continue to receive discovery messages under certain conditions. As such, the method, apparatus and computer program product of an example embodiment may permit ProSe operation by a mobile terminal, such as a mobile terminal that has moved, even though the mobile terminal is now camped onto an access point 10 that does not support ProSe. Consequently, the user of the mobile terminal may have an improved user experience including, for example, continuity in ProSe operation under certain conditions following the cell re-selection regardless of whether the access point to which the mobile terminal is now camped supports ProSe or not.

The mobile terminal 12 may comprise or otherwise include an apparatus that may be specifically configured in order to perform the operations described below in conjunction with an example embodiment of the present invention. Similarly, the access point 10 of a cellular network may comprise or otherwise include an apparatus that may be specifically configured in order to perform the operations described below from the perspective of the access point. By way of example, but not of limitation, reference is now made to FIG. 3 in which a schematic block diagram of an apparatus that may be alternatively embodied, included or otherwise associated with a mobile terminal and/or an access point is depicted. However, it should be noted that the components, devices or elements described below may not be mandatory and thus some may be omitted in certain embodiments. Additionally, some embodiments may include further or different components, devices or elements beyond those shown and described herein.

Figure 3:
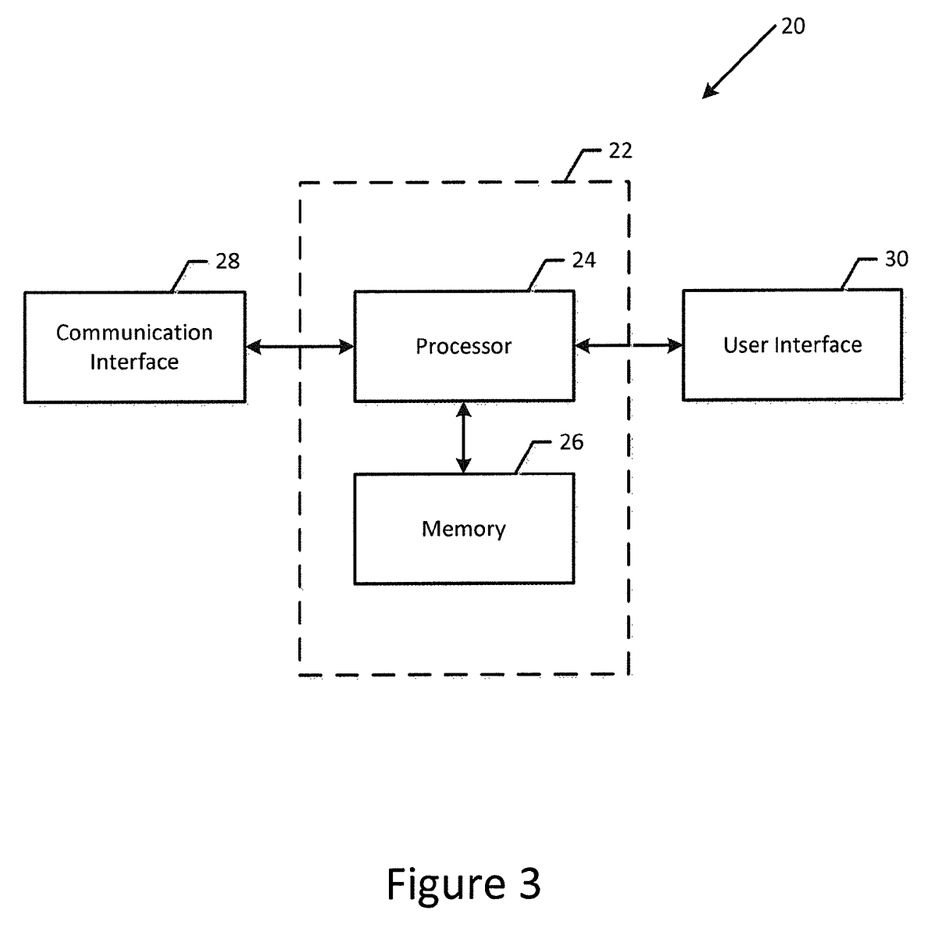
FIG. 3 is a block diagram of an apparatus that may be specifically configured in accordance with an example embodiment of the present invention.

As shown in FIG. 3, the apparatus 20 may include or otherwise be in communication with a processing system 22 including, for example, processing circuitry that is configurable to perform actions in accordance with some example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 24 and memory 26 that may be in communication with or otherwise control a communication interface 28 and, in some cases in which the apparatus is embodied by a mobile terminal 12, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal, the processing circuitry may be embodied as a portion of a mobile terminal, while in some embodiment taken in the context of an access point 10, the processing circuitry may be embodied as a portion of the mobile terminal.

The user interface 30 (if implemented in embodiments of the apparatus 20 embodied by the mobile terminal 12) may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the station by receiving user input and providing output.

The communication interface 28 may include one or more interface mechanisms for enabling communication with other devices and/or networks. In the context of a mobile terminal 12, the communication interface may enable communication with the access point(s) 10 and D2D communication with other mobile terminals. In some cases, the communication interface may be any means such as a device or circuitry embodied in either hardware, or a combination of hardware and software that is configured to receive and/or transmit data from/to a network and/or any other device or module in communication with the processing circuitry, such as between the mobile terminal and the access point and/or directly between mobile terminals. In this regard, the communication interface may include, for example, an antenna (or multiple antennas) and supporting hardware and/or software, such as a receiver, for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In accordance with an example embodiment, a mobile terminal 12 may be camped on to a second cell 16 that does not support ProSe, but may receive discovery messages from a mobile terminal camped on to first cell 14 that does support ProSe. Although the mobile terminal need not have been previously camped on to the first cell and then undergone cell re-selection so as to transition to the second cell, an example embodiment will now be described by way of illustration, but not of limitation, in which a mobile terminal re-selects from a first cell that supports ProSe to a second cell that does not support ProSe while continuing to support ProSe operation.

Figure 4:
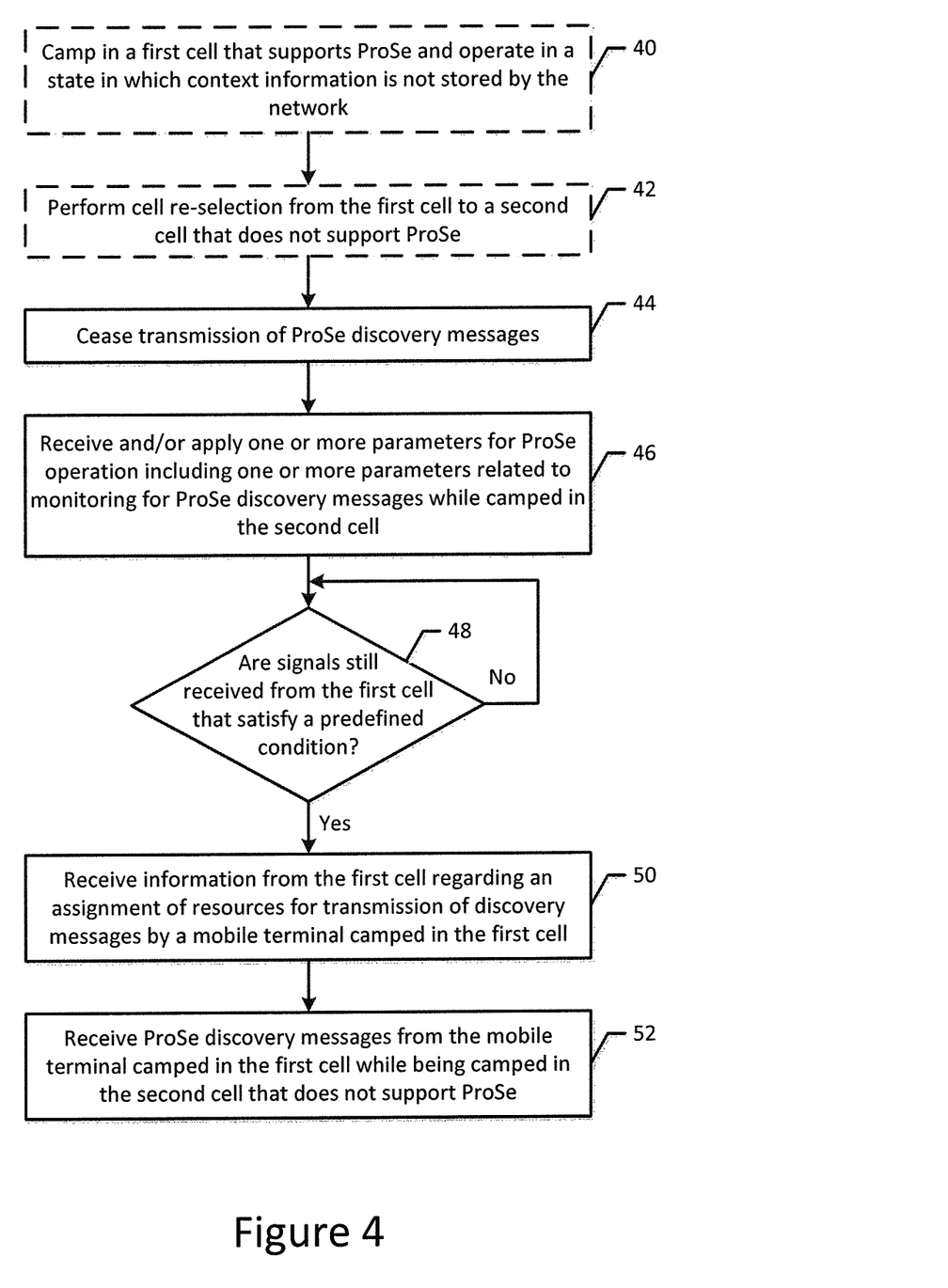
FIG. 4 is a flow chart illustrating the operations performed, such as by the apparatus of FIG. 3, from the perspective of a mobile terminal in accordance with an example embodiment of the present invention.

Referring now to FIG. 4, the operations performed from the perspective of a mobile terminal 12 in regards to the continuation of ProSe operation following optional re-selection to a cell that does not support ProSe are depicted. In this regard and as shown in block 40 of FIG. 4, the apparatus 20 may include means, such as the processing circuitry 22, the processor 24, the communication interface 28 or the like, for optionally camping in a first cell 14 that supports ProSe. While camping in the first cell that supports ProSe in accordance with this example embodiment, the mobile terminal may engage in ProSe operation, such as D2D communication with one or more other mobile terminals in proximity therewith. In this regard, mobile terminals will be considered in proximity with one another in an instance in which the mobile terminals are capable of communicating directly with one another, such as via Bluetooth, ZigBee or other proximity-based wireless communication technique without transmission of the signals via a wide area network, such as a cellular network.

In at least some instances, the apparatus 20 embodied by the mobile terminal 12 may be operating in a state in which context information is not stored by the network. For example, the mobile terminal may be operating in an RRC_Idle state. As another example, the mobile terminal may be in a hybrid RRC state in which the mobile terminal is synchronized with the network as in the RRC_Connected state, but the network including the access point 10 that serves the first cell 14 does not create and store context for the mobile terminal as in the RRC_Idle state.

As shown in optional block 42 of FIG. 4, the apparatus 20 embodied by the mobile terminal 12 may include means, such as the processing circuitry 22, the processor 24, the communication interface 28 or the like, for optionally performing cell re-selection from the first cell 14 that supports ProSe to a second cell 16 that does not support ProSe. By supporting ProSe, a cell may provide radio resources for discovery operation, such as uplink resources allocated by the serving network system for the transmission and reception of ProSe discovery requests. As such, the second cell that does not support ProSe operation does not provide radio resources for discovery operation and, as such, does not allocate uplink resources for the transmission and reception of ProSe discovery messages. The optional cell re-selection may be caused by various reasons including movement of the mobile terminal such as shown in FIGS. 1 and 2, variations in the operation of the cells such as the strength of the signals transmitted by the access points 10 within the respective cells, interference conditions within the respective cells or the like. The apparatus, such as the processing circuitry, the processor or the like, embodied by the mobile terminal may be triggered to perform cell re-selection for a variety of reasons including, for example, the relative signal strength of the signals transmitted with the respective access points that serve the respective cells, interference conditions with respect to the signals transmitted with the access points that define the respective cells, reliability criteria associated with signals transmitted to and/or from the access points that define the respective cells or the like.

Regardless of the manner in which the mobile terminal 12 is caused to perform cell re-selection, a mobile terminal that is operating in a state in which context information is not stored by the network, such as the RRC_Idle state or a hybrid RRC state as described above, may optionally re-select from the first cell 14 to the second cell 16 that does not support ProSe and camp onto the second cell as shown in FIG. 2. Since the second cell does not support ProSe, the apparatus 20 embodied by the mobile terminal may include means, such as the processing circuitry 22, the processor 24, the communication interface 28 or the like, for ceasing transmission of ProSe discovery messages. See block 44 of FIG. 4. However, the mobile terminal of this example embodiment that has re-selected from the first cell to the second cell may remain in proximity to other mobile terminals that continue to be served by the first cell that does support ProSe and, indeed, the mobile terminal may continue to be capable of receiving signals from the access point that serves the first cell. For example, the mobile terminal may have moved closer to the second cell, but may be positioned within a region that is within both the first and second neighboring cells so as to be capable of receiving signals from the access points that serve the first and second cells.

In this scenario, the apparatus 20 embodied by the mobile terminal 12 may include means, such as the processing circuitry 22, the processor 24, the communication interface 28 or the like, for determining whether signals are still received from the access point 10 that defines the first cell 14 that supports ProSe that satisfy a predefined condition. See block 48 of FIG. 4. The predefined condition may be defined in various manners. In one example embodiment, the apparatus embodied by the mobile terminal may include means, such as the processing circuitry, the processor, the communication interface or the like, for receiving and/or applying one or more parameters for ProSe operation from the access point that serves the first cell. See block 46 of FIG. 4. The parameters for ProSe operation may be provided by the access point that serves the first cell in various manners. For example, the parameters for ProSe operation may be included in a broadcast message, such as within a session information block (SIB) broadcast by the access point that serves the first cell. Alternatively, the parameters for ProSe operation may be provided via dedicated signaling from the access point that serves the first cell to the mobile terminal, such as may be provided concurrent with or otherwise in conjunction with the release of the connection between the access point that serves the first cell and the mobile terminal, such as in conjunction with the RRCConnectionRelease message. As another example, the apparatus 20 embodied by the mobile terminal 12 may have previously stored, such as in memory 26, or otherwise have access to predefined parameters for ProSe operation including one or more parameters related to monitoring for ProSe discovery messages while the mobile terminal is camped in the second cell. In a further example, the parameters for ProSe operation may be predefined by the specifications that govern operation of the network and the mobile terminals that utilize the network or may be defined by the network operator and provided by the network, such as the E-UTRAN.

The one or more parameters are related to monitoring for ProSe discovery messages while the mobile terminal is camped in the second cell 16. By way of example, the parameters for ProSe operation provided by the first cell that supports ProSe operation may define the condition under which it will be considered that the mobile terminal still receives signals from the first cell with sufficient reliability. For example, the parameters may include a predefined signal strength, e.g., a predefined power level for common reference symbol(s) of the first cell, a predefined reliability criteria, e.g., a predefined reference signal received quality (RSRQ) measurement of the first cell. Other parameters may include an allowed transmit power, a time for which the current parameters are effective prior to having to again confirm or update the parameters or the like. As such, the apparatus embodied by the mobile terminal of this example embodiment may determine that signals are still received from the first cell that satisfy a predefined condition in which the signals from the first cell have a greater strength than the predefined signal strength, a greater reliability than the predefined reliability criteria or the like.

In an instance in which it is determined that the signals received from the first cell fail to satisfy the predefined condition, the apparatus 20 embodied by the mobile terminal 12 may continue to monitor the signals provided by the first cell 14 in order to determine whether the signals received from the first cell subsequently satisfy the predefined condition. However, in an instance in which it is determined that the signals received from the first cell satisfy the predefined condition, the apparatus embodied by the mobile terminal may include means, such as the processing circuitry 22, the processor 24, the communication interface 28 or the like, for receiving ProSe discovery messages from a mobile terminal camped in the first cell while itself being camped in the second cell 16 that does not support ProSe. In this regard, the mobile terminal that has re-selected to the second cell may continue to receive discovery messages, even though the mobile terminal no longer transmits discovery messages following the re-selection to the second cell that does not support ProSe.

As such, the mobile terminal 12 may continue to provide ProSe operation, such as by communicating directly with one or more mobile terminals camped onto the first cell 14 that does support ProSe even though the mobile terminal has re-selected and is now camped onto the second cell 16 that does not support ProSe. In this regard, following receipt of the discovery message, the mobile terminal may conduct D2D communication with a mobile terminal within the first cell that is camped onto the access point that serves the first cell and that supports ProSe. Thus, the method, apparatus 20 and computer program product of an example embodiment may provide for improved user experience by providing continuity of ProSe operations, such as D2D communications, in certain situations in which a mobile terminal re-selects to a cell that does not support ProSe.

In an example embodiment, the apparatus 20 embodied by the mobile terminal 12 may also include means, such as the processing circuitry 22, the processor 24, the communication interface 28 or the like, for receiving information from the access point 10 that serves the first cell 14 regarding an assignment of resources for the transmission of discovery messages by a mobile terminal camped in the first cell. See block 50 of FIG. 4. In this example embodiment, following a determination that the signals received from the first cell satisfy the predefined condition, the apparatus embodied by the mobile terminal may receive the information from the access point that serves the first cell regarding the assignment of resources and, based upon this information, may be appropriately configured so as to receive the ProSe discovery messages from the mobile terminal camped on the first cell. Thus, the apparatus embodied by a mobile terminal camped on the second cell 16 may also include means, such as the processing circuitry, the processor, the communication interface or the like, for receiving ProSe discovery messages from a mobile terminal camped on the first cell. See block 52 of FIG. 4. The information regarding the assignment of resources may be provided in a variety of manners including within a session information block (SIB) transmitted by the access point that serves the first cell.

From the perspective of the access point 10 that serves the first cell 14, the apparatus 20 embodied by the access point may include means, such as the processing circuitry 22, the processor 24, the communication interface 28 or the like, for providing support for ProSe operation for a mobile terminal 12 that is camped in the first cell. See block 60 of FIG. 5. As described above, the mobile terminal may be operating in a variety of states, but, in the following example embodiment, as in a state, such as an RRC_Idle state or the hybrid RRC state described above, in which context information is not stored by the network and, as such, is not stored by the access point that serves the first cell.

Figure 5:
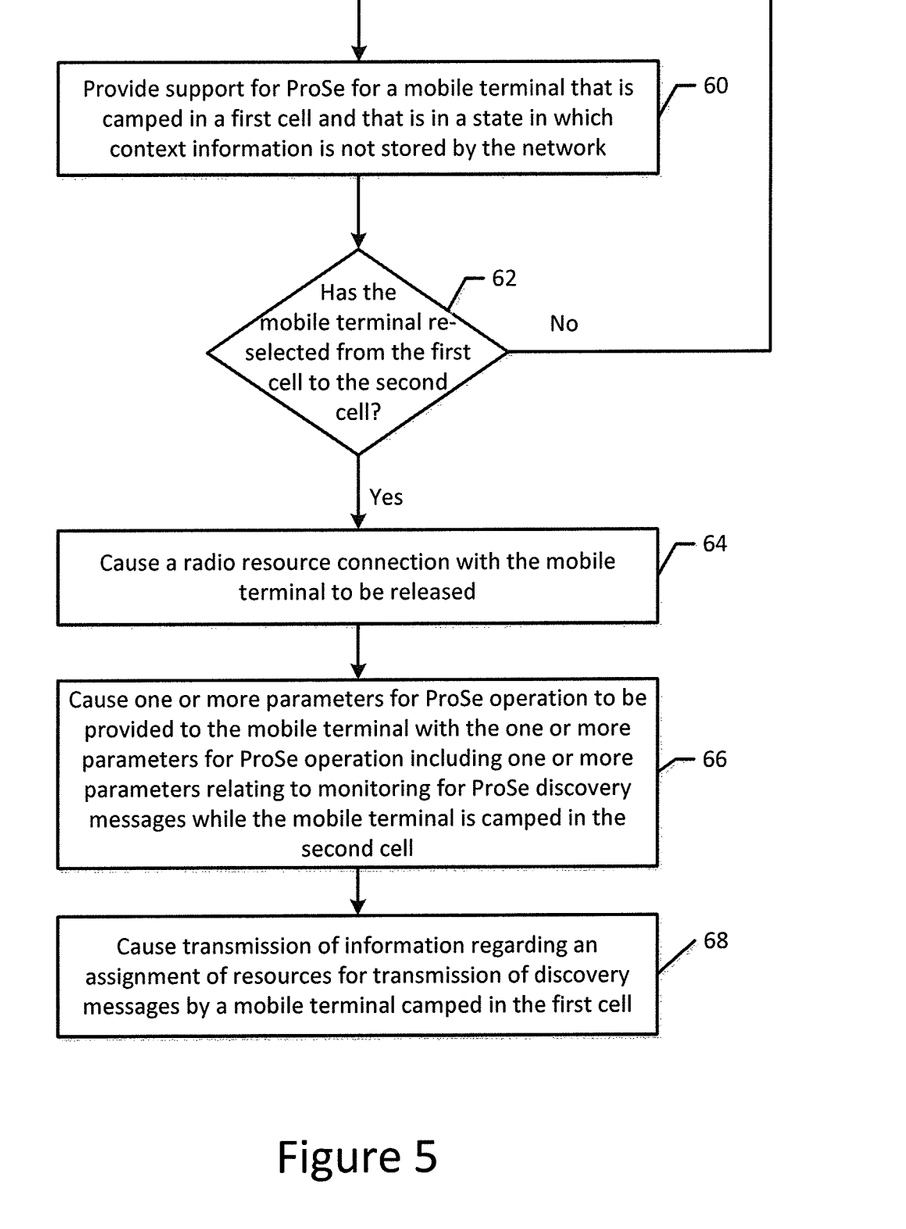
FIG. 5 is a flow chart illustrating the operations performed, such as by the apparatus of FIG. 3, from the perspective of an access point in accordance with an example embodiment of the present invention.

In this example embodiment and as shown in block 62 of FIG. 5, the apparatus 20 embodied by the access point 10 may also include means, such as the processing circuitry 22, the processor 24, the communication interface 28 or the like, for determining whether the mobile terminal 12 has re-selected from the first cell 14 to the second cell 16. The access point may make this determination in various manners including based upon signals provided by the mobile terminal, the access point that serves the second cell or by the network, such as the cellular network with which the access points are in communication. In an instance in which the mobile terminal has not re-selected from the first cell to the second cell, the access point that serves the first cell may continue to support the mobile terminal including provision of support for ProSe operation. However, in an instance in which the access point determines that a mobile terminal has re-selected from the first cell to the second cell, the apparatus embodied by the access point may include means, such as the processing circuitry, the processor, the communication interface or the like, for causing a radio resource connection with the mobile terminal to be released. See block 64 of FIG. 5. As described above, however, the mobile terminal may remain in sufficient proximity to the access point that serves the first cell so as to receive signals from the first cell, such as in instances as shown on FIG. 2 in which the mobile terminal is located within a region that is included within both the first and second neighboring cells.

As shown in block 66 of FIG. 5, the apparatus 20 embodied by the access point 10 may also include means, such as the processing circuitry 22, the processor 24, the communication interface 28 or the like, for causing one or more parameters for ProSe operation to be provided to the mobile terminal 12 following the re-selection of the mobile terminal from the first cell 14 to the second cell 16. These parameters may be provided in conjunction with or following the release of the radio resource connection. As described above, the one or more parameters for ProSe operation may include one or more parameters related to monitoring for ProSe discovery messages while the mobile terminal is camped in the second cell. While various parameters may be provided, examples of these parameters include a predefined signal strength, a predefined reliability criteria or the like. Additionally, the apparatus embodied by the access point may include means, such as the processing circuitry, the processor, the communication interface or the like, for causing transmission of information regarding an assignment of resources for transmission of discovery messages by a mobile terminal camped in the first cell. See block 68 of FIG. 5. The access point may provide this information in various manners including within a session information block (SIB) that is transmitted in conjunction with or following the release of the radio resource connection.

Based upon the one or more parameters for ProSe operation that are provided by the access point 10 to the mobile terminal 12 and the information regarding the assignment of resources for transmission of discovery messages by a mobile terminal camped in the first cell 14, the mobile terminal that has re-selected to the second cell 16 may receive discovery messages from a mobile terminal that remains camped in the first cell. The method, apparatus 20 and computer program product of an example embodiment may facilitate continued ProSe operation by the mobile terminal that has re-selected to the second cell including, for example, D2D communication.

Figure 6:
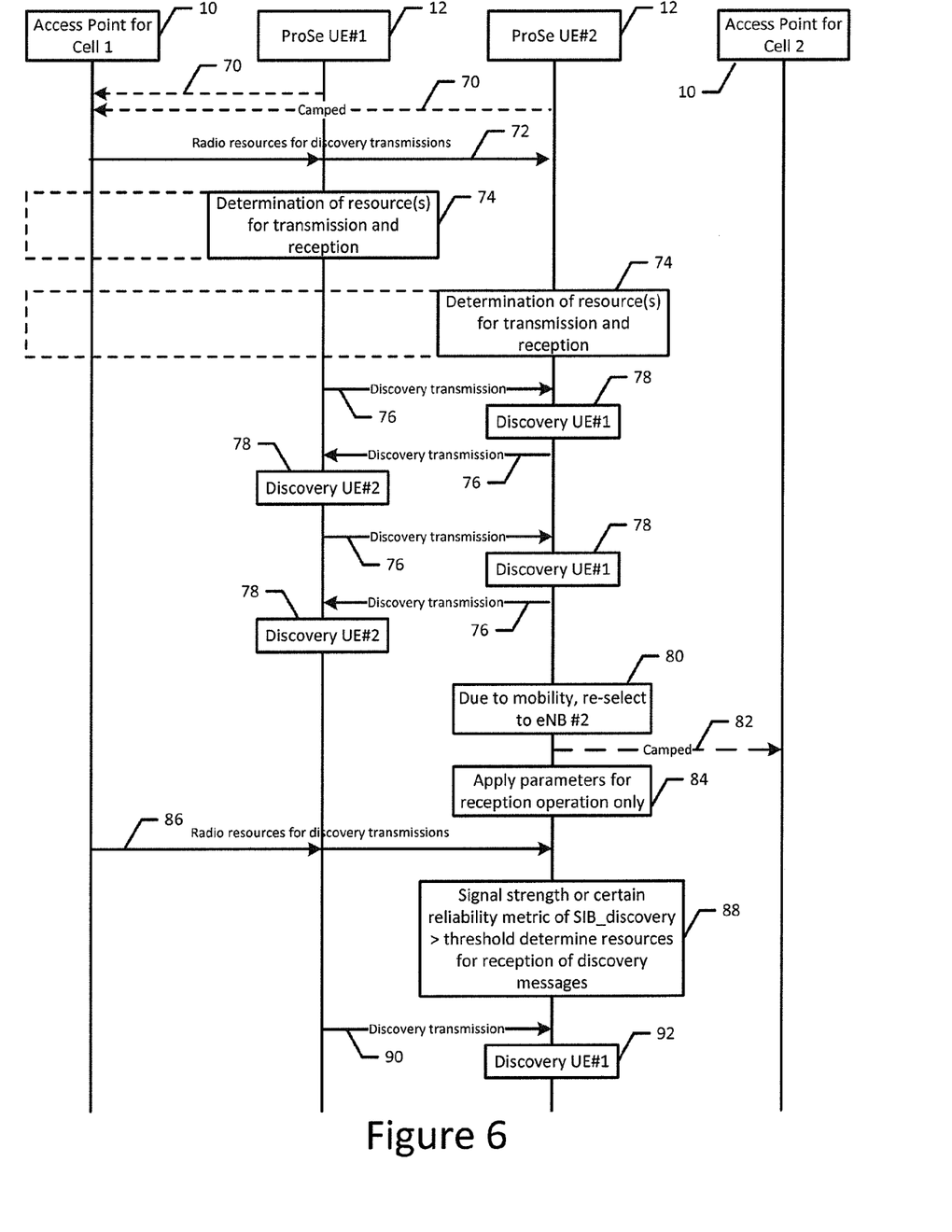
FIG. 6 is a signal flow diagram of the communications between the access points of the first and second cells and the mobile terminals in accordance with one example of the present invention.

By way of an example of the communications between the access points 10 of the first and second cells 14, 16 and the mobile terminals 12, reference is now made to FIG. 6. As shown at 70 in FIG. 6, the mobile terminals are initially camped onto access point that serves the first cell that supports ProSe. As such, the access point that serves the first cell provides radio resources at 72 for ProSe discovery transmissions such that the mobile terminals are capable of determining at 74 the resources available for transmission and reception of ProSe messages. Consistent with the available radio resources, the mobile terminals may issue ProSe discovery messages at 76 to permit the other mobile terminals located proximate thereto to discover their presence at 78 such that subsequent D2D communications or other direct communications may be established between the mobile terminals.

Following movement of the mobile terminal 12 to a position closer to the access point 10 that serves the second cell 16 and further from the access point that serves the first cell 14, the mobile terminal may re-select at 80 from the access point that serves the first cell to the access point that serves the second cell and then camp onto the access point that serves the second cell at 82. In this example, the second cell does not support ProSe. However, based upon information provided by the access point that serves the first cell and/or information previously stored by the mobile terminal or otherwise accessible to the mobile terminal, the mobile terminal may apply one or more parameters at 84 to guide subsequent reception of ProSe discovery messages, even though the mobile terminal is now camped on to an access point that does not support ProSe. Additionally, the access point that serves the first cell and that supports ProSe service may provide information at 86 regarding the radio resources available for ProSe discovery transmission. In an instance in which the mobile terminal is able to receive signals from the first cell that support ProSe services that satisfy a predefined threshold as shown at 88, such as a predefined signal strength or a predefined reliability criteria, the mobile terminal that is now camped onto the access point that serves the second cell and that does not support ProSe services may be configured to receive at 90 discovery messages from the mobile terminal(s) that have remained camped onto the access point that serves the first cell that support ProSe services. Thus, the mobile terminal that has re-selected to the second cell may receive a ProSe discovery message and may, in turn, discover at 92 the mobile terminal that is camped onto the access point that serves the first cell. As such, ProSe operations including D2D communications and other direct communications between the mobile terminals may continue even though one of the mobile terminals has re-selected to a second cell that is served by an access point that does not support ProSe services.

As noted above, FIGS. 4 and 5 are flowcharts illustrating the operations performed by a method, apparatus and computer program product, such as apparatus 20 of FIG. 3, in accordance with an example embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 4 and 5, when executed, convert a computer or processing circuitry into a particular machine configured to perform an example embodiment of the present invention. Accordingly, the operations of FIGS. 4 and 5 define an algorithm for configuring a computer or processing circuitry, e.g., processor, to perform an example embodiment. In some cases, a general purpose computer may be provided with an instance of the processor which performs the algorithm of FIGS. 4 and 5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Although examples of the order of operations are shown in FIGS. 4 and 5, the at least some of the operations may be performed in a different order in other embodiments. In some embodiments, certain ones of the operations above may be modified or further amplified as described below. Moreover, in some embodiments additional optional operations may also be included, such as shown with respect to optional blocks 40 and 42 in FIG. 4. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   releasing a radio resource connection (RRC) with a first cell;
   camping on a second cell that does not support proximity-based services (ProSe);
   receiving one or more parameters for ProSe operation including one or more parameters related to monitoring for discovery messages while camped on the second cell;
   determining, with a processor while camped on the second cell, whether signals are received from a first cell that does support ProSe that satisfy a predefined condition; and
   receiving a discovery message from a mobile terminal camped in the first cell while being camped in the second cell in a case that the predefined condition is satisfied.

2. The method according to claim 1, wherein receiving the one or more parameters comprises receiving the one or more parameters upon release of the RRC with the first cell.

3. The method according to claim 1, wherein the predefined condition comprises at least one of predefined strength of the signals from the first cell, a predefined reliability metric, an allowed transmit power level or a time for which one or more parameters will remain effective.

4. The method according to claim 1, further comprising:
   receiving, while camped on the second cell, information from the first cell regarding an assignment of resources for transmission of discovery messages by the mobile terminal camped on the first cell.

5. The method according to claim 1, further comprising performing cell re-selection from the first cell to the second cell prior to camping on the second cell.

6. A method comprising:
   performing cell re-selection from a first cell that does support proximity-based services (ProSe) to a second cell that does not support ProSe;
   camping on the second cell;

ceasing transmission of discovery messages upon re-selection to the second cell;
determining, with a processor while camped on the second cell, whether signals are received from the first cell that satisfy a predefined condition; and
receiving a discovery message from a mobile terminal camped on the first cell while being camped on the second cell in a case that the predefined condition is satisfied.

7. An apparatus comprising:
circuitry configured to
release a radio resource connection (RRC) with a first cell;
camp on a second cell that does not support proximity-based services (ProSe);
receive one or more parameters for ProSe operation including one or more parameters related to monitoring for discovery messages while camped on the second cell;
determine, while camped on the second cell, whether signals are received from a first cell that does support ProSe that satisfy a predefined condition; and
receive a discovery message from a mobile terminal camped on the first cell while being camped on the second cell in a case that the predefined condition is satisfied.

8. The apparatus according to claim 7, wherein
the circuitry is configured to receive the one or more parameters by receiving the one or more parameters upon release of the RRC with the first cell.

9. The apparatus according to claim 7, wherein
the predefined condition comprises at least one of a predefined strength of the signals from the first cell, a predefined reliability metric, an allowed transmit power level or a time for which one or more parameters will remain effective.

10. The apparatus according to claim 7, wherein
the circuitry is configured receive, while camped on the second cell, information from the first cell regarding an assignment of resources for transmission of discovery messages by the mobile terminal camped on the first cell.

11. The apparatus according to claim 7, wherein
the circuitry is configured to perform cell re-selection from the first cell to the second cell prior to camping on the second cell.

12. The apparatus according to claim 7, wherein
the apparatus comprises or is embodied by a mobile terminal.

13. An apparatus comprising:
circuitry configured to
perform cell re-selection from a first cell that does support proximity-based services (ProSe) to a second cell that does not support ProSe;
camp on the second cell;
cease transmission of discovery messages upon re-selection to the second cell;
determine, while camped on the second cell, whether signals are received from the first cell that satisfy a predefined condition; and
receive a discovery message from a mobile terminal camped on the first cell while being camped on the second cell in a case that the predefined condition is satisfied.

14. An apparatus comprising:
circuitry configured to
provide support for proximity-based services (ProSe) for a mobile terminal that is camped on a first cell;
determine that the mobile terminal has re-selected from the first cell to a second cell;
cause a radio resource connection with the mobile terminal to be released; and
cause one or more parameters for ProSe operation to be provided to the mobile terminal upon release of the radio resource connection with the mobile terminal, wherein the one or more parameters for ProSe operation include one or more parameters relating to monitoring for a discovery message while the mobile terminal is camped on the second cell.

15. The apparatus according to claim 14, wherein
the circuitry is configured to cause the one or more parameters for ProSe operation to be provided by causing a broadcast of the one or more parameters for ProSe operation to be provided upon release of the radio resource connection with the mobile terminal.

16. The apparatus according to claim 14, wherein
the one or more parameters define at least one of a predefined signal strength, a predefined reliability metric, an allowed transmit power level or a time for which one or more parameters will remain effective.

17. The apparatus according to claim 14, wherein
the apparatus comprises or is embodied by an access point for a cellular network.

* * * * *